US012748932B2

(12) United States Patent
Lin et al.

(10) Patent No.: US 12,748,932 B2
(45) Date of Patent: Sep. 29, 2026

(54) COMPRESSION OF WORD EMBEDDINGS FOR NATURAL LANGUAGE PROCESSING SYSTEMS

(71) Applicant: Microsoft Technology Licensing, LLC, Redmond, WA (US)

(72) Inventors: Xihui Lin, Montreal (CA); Andrew James Mcnamara, Cambridge (CA); Kaheer Suleman, Cambridge (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/057,018

(22) Filed: Nov. 18, 2022

(65) Prior Publication Data

US 2023/0083335 A1 Mar. 16, 2023

Related U.S. Application Data

(63) Continuation of application No. 15/685,929, filed on Aug. 24, 2017, now abandoned.

(51) Int. Cl.
*G06F 40/126* (2020.01)
*G06F 40/30* (2020.01)
(Continued)

(52) U.S. Cl.
CPC ............ *G06F 40/44* (2020.01); *G06F 40/126* (2020.01); *G06F 40/30* (2020.01); *G06N 3/044* (2023.01);
(Continued)

(58) Field of Classification Search
None
See application file for complete search history.

(56) References Cited

U.S. PATENT DOCUMENTS 9,306,597 B1 * 4/2016 Daniel ................ H03M 7/3091
10,445,356 B1 * 10/2019 Mugan .................... G06F 40/30
(Continued)

FOREIGN PATENT DOCUMENTS

CN 105043433 A 11/2015
CN 106202010 A 12/2016
(Continued)

OTHER PUBLICATIONS

Paula Lauren;Guangzhi Qu; Guang-Bin Huang; Paul Watta; Amaury Lendasse; A low-dimensional vector representation for words using an extreme learning machine; URL: https://ieeexplore.ieee.org/stamp/stamp.jsp?arnumber=7966071; May 2017 (Year: 2017).*
(Continued)

*Primary Examiner* — Richa Sonifrank
(74) *Attorney, Agent, or Firm* — Alleman Hall LLP

(57) ABSTRACT

Described herein are systems and methods that provide a natural language processing system (NLPS) that employs compressed word embeddings. An auto-encoder that includes encoder circuitry and decoder circuitry can be used to produce the compressed word embeddings. The decoder circuitry is trained to decompress the word embeddings with reduced or minimal differences between the original uncompressed word embeddings and the corresponding decompressed word embeddings. One or more parameters of the trained decoder circuitry are transferred to the NLPS, where the NLPS is then trained using the compressed word embeddings to improve the correctness of the responses or actions determined by the NLPS.

19 Claims, 9 Drawing Sheets

(51) Int. Cl.

| | |
|---|---|
| ***G06F 40/44*** | (2020.01) |
| ***G06N 3/044*** | (2023.01) |
| ***G06N 3/045*** | (2023.01) |
| ***G06N 3/0455*** | (2023.01) |
| ***G06N 3/0495*** | (2023.01) |
| ***G06N 3/08*** | (2023.01) |
| ***G06N 3/09*** | (2023.01) |
| ***G06N 5/04*** | (2023.01) |
| ***G06N 20/00*** | (2019.01) |
| ***G10L 13/027*** | (2013.01) |

(52) U.S. Cl.

CPC ........... *G06N 3/045* (2023.01); *G06N 3/0455* (2023.01); *G06N 3/0495* (2023.01); *G06N 3/08* (2013.01); *G06N 3/09* (2023.01); *G06N 5/04* (2013.01); *G06N 20/00* (2019.01); *G10L 13/027* (2013.01)

(56) References Cited

U.S. PATENT DOCUMENTS

| | | | | |
|---|---|---|---|---|
| 2011/0078099 | A1* | 3/2011 | Weston | G16B 40/20<br>706/12 |
| 2013/0346443 | A1* | 12/2013 | Kataoka | G06F 16/3331<br>707/769 |
| 2016/0321541 | A1* | 11/2016 | Liu | G06N 3/08 |
| 2016/0350288 | A1* | 12/2016 | Wick | G06F 40/44 |
| 2017/0010811 | A1* | 1/2017 | Sato | G06F 3/0688 |
| 2018/0268806 | A1* | 9/2018 | Chun | G10L 13/027 |
| 2018/0336183 | A1* | 11/2018 | Lee | G06F 40/30 |
| 2019/0051292 | A1* | 2/2019 | Na | G10L 15/16 |
| 2019/0294980 | A1* | 9/2019 | Laukien | G06N 3/049 |
| 2019/0311002 | A1* | 10/2019 | Paulus | G06F 16/345 |
| 2020/0202846 | A1* | 6/2020 | Bapna | G10L 15/1815 |
| 2021/0011904 | A1* | 1/2021 | James | G06N 20/00 |

FOREIGN PATENT DOCUMENTS

| | | |
|---|---|---|
| CN | 106448660 A | 2/2017 |
| CN | 106997370 A | 8/2017 |

OTHER PUBLICATIONS

Pierre Baldi; Autoencoders, Unsupervised Learning, and Deep Architectures; 2012; URL: http://proceedings.mlr.press/v27/baldi12a/baldi12a.pdf (Year: 2012).*

Martin Andrews; Compressing Word Embeddings; May 16, 2016; URL: https://arxiv.org/pdf/1511.06397v1 (Year: 2016).*

Dayiheng Liu; Jiancheng Lv; Xiaofeng Qi; Jiangshu Wei; A neural words encoding model; Jul. 2016; URL: https://ieeexplore.ieee.org/document/7727245 (Year: 2016).*

Y. Adi; E. Kermany; Y. Belinkov; O. Lavi; Y. Goldberg; Analysis of sentence embedding models using prediction tasks in natural language processing; Sep. 2017; URL: https://ieeexplore.ieee.org/abstract/document/8030297 (Year: 2017).*

"Second Office Action and Search Report Issued in Chinese Patent Application No. 201880053393.9", Mailed Date: Jul. 25, 2023, 11 Pages.

Xuanru, et al., "The Promotion Effects of Artificial Intelligence on e-Science", in the Journal of Technology and Application of Scientific Research Informatization, Issue 6, Nov. 20, 2016, 14 Pages.

Notice to Grant Received for Chinese Application No. 201880053393.9, mailed on Jan. 4, 2024, 3 pages.

Communication under Rule 71(3) Received for European Application No. 18740062.7, mailed on Nov. 17, 2021, 7 pages.

Decision to Grant Received for European Application No. 18740062.7, mailed on Feb. 17, 2022, 2 pages.

Tissier, et al., "Near-lossless Binarization of Word Embeddings", in Repository of arXiv:1803.09065v3, Nov. 15, 2018, 08 Pages.

* cited by examiner

COMPRESSION OF WORD EMBEDDINGS FOR NATURAL LANGUAGE PROCESSING SYSTEMS

CROSS-REFERENCE TO RELATED APPLICATIONS

This application is a continuation of U.S. patent application Ser. No. 15/685,929, filed Aug. 24, 2017, the entire disclosure of which is hereby incorporated by reference in its entirety.

BACKGROUND

Comprehension of natural language by machines, at a near-human level, is a major goal for Artificial Intelligence. Indeed, most human knowledge is collected in the natural language of text. Machine comprehension of unstructured, real-world text has therefore garnered significant attention from scientists, engineers, and scholars. This is due, at least in part, to the fact many natural language processing tasks, such as information extraction, relation extraction, text summarization, or machine translation, depend implicitly or explicitly on a machine's ability to understand and reason with natural language.

Many natural language processing systems (NLPS) employ word embeddings that model or represent words and phrases from a vocabulary. The word embeddings typically map the words and phrases to vectors of real numbers. When a language input is received, a NLPS obtains the corresponding word embedding for some or all of the words in the language input. In some instances, the word embeddings are stored in a matrix that can be quite large. For example, a large vocabulary can produce a large matrix, or the language type (e.g., English) can result in a large matrix. It can be difficult to store a large matrix in an electronic device that has a limited amount of memory.

It is with respect to these and other general considerations that embodiments have been described. Also, although relatively specific problems have been discussed, it should be understood that the embodiments should not be limited to solving the specific problems identified in the background.

SUMMARY

Embodiments disclosed herein provide a natural language processing system that employs compressed word embeddings. In one aspect, a system includes an auto-encoder processing unit, a first storage device, and a second storage device. The auto-encoder processing unit includes encoder circuitry and decoder circuitry. The first storage device stores computer executable instructions that when executed by the auto-encoder processing unit performs a method. The method includes compressing, by the encoder circuitry, one or more uncompressed word embeddings to produce one or more compressed word embeddings. The one or more compressed word embeddings are decompressed by the decoder circuitry. In one embodiment, each of the one or more uncompressed word embeddings includes a vector of real numbers, each of the one or more compressed word embeddings comprises a vector of binary numbers, and each of the one or more decompressed word embeddings comprises a vector of real numbers. The second storage device stores one or more parameters of the decoder circuitry.

In another aspect, a method includes training at a first time a natural language processing system (NLPS) using uncompressed word embeddings and training decoder circuitry in an auto-encoder processing unit with compressed word embeddings that correspond to the uncompressed word embeddings. In one embodiment, each uncompressed word embedding comprises a vector of real numbers and each compressed word embedding includes a vector of binary numbers. The compressed word embeddings are produced by encoder circuitry in the auto-encoder processing unit. One or more parameters in the NLPS are replaced with one or more parameters in the trained decoder circuitry. At a second time, the NLPS is trained using the compressed word embeddings.

In yet another aspect, an electronic device includes an input device for receiving a natural language input, a storage device for storing compressed word embeddings, and a natural language processing system. The natural language processing system includes natural language understanding (NLU) circuitry that is connected to the storage device, and processing circuitry operably connected to the NLU circuitry. The NLU circuitry obtains one or more compressed word embeddings that represent at least one word in the natural language input. The processing circuitry receives the compressed word embeddings, decompresses the compressed word embeddings, and processes the decompressed word embeddings to determine an action to be taken by the electronic device in response the natural language input. In one embodiment, each compressed word embedding comprises a vector of binary numbers and each decompressed word embedding comprises a vector of real numbers.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures. The elements of the drawings are not necessarily to scale relative to each other. Identical reference numerals have been used, where possible, to designate identical features that are common to the figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Embodiments described herein provide a natural language processing system (NLPS) that employs compressed word embeddings. As described earlier, word embeddings model or represent words and/or phrases from a vocabulary. In one aspect, the word embeddings are stored in a large matrix, making it difficult to store the matrix in an electronic device that has a limited amount of memory.

The compressed word embeddings can be binary numbers that may be stored compactly as bits instead of bytes (float number) in electronic devices that have limited amounts of storage. Additionally, an electronic device may operate a NLPS independent of any other computing devices when the compressed word embeddings are stored in the electronic device.

Embodiments disclosed herein use an auto-encoder that includes encoder circuitry and decoder circuitry. In aspects, the auto-encoder can be implemented as a multi-layer neural network, where the encoder circuitry is one layer and the decoder circuitry is another layer. The encoder circuitry is used to produce the compressed word embeddings. The decoder circuitry is trained to decompress the word embeddings with reduced or minimal differences between the original uncompressed word embeddings and the corresponding decompressed word embeddings. One or more parameters of the trained decoder circuitry are transferred to the NLPS, where the NLPS is then trained using the compressed word embeddings to improve the correctness of the responses or actions determined by the NLPS.

Figure 1:
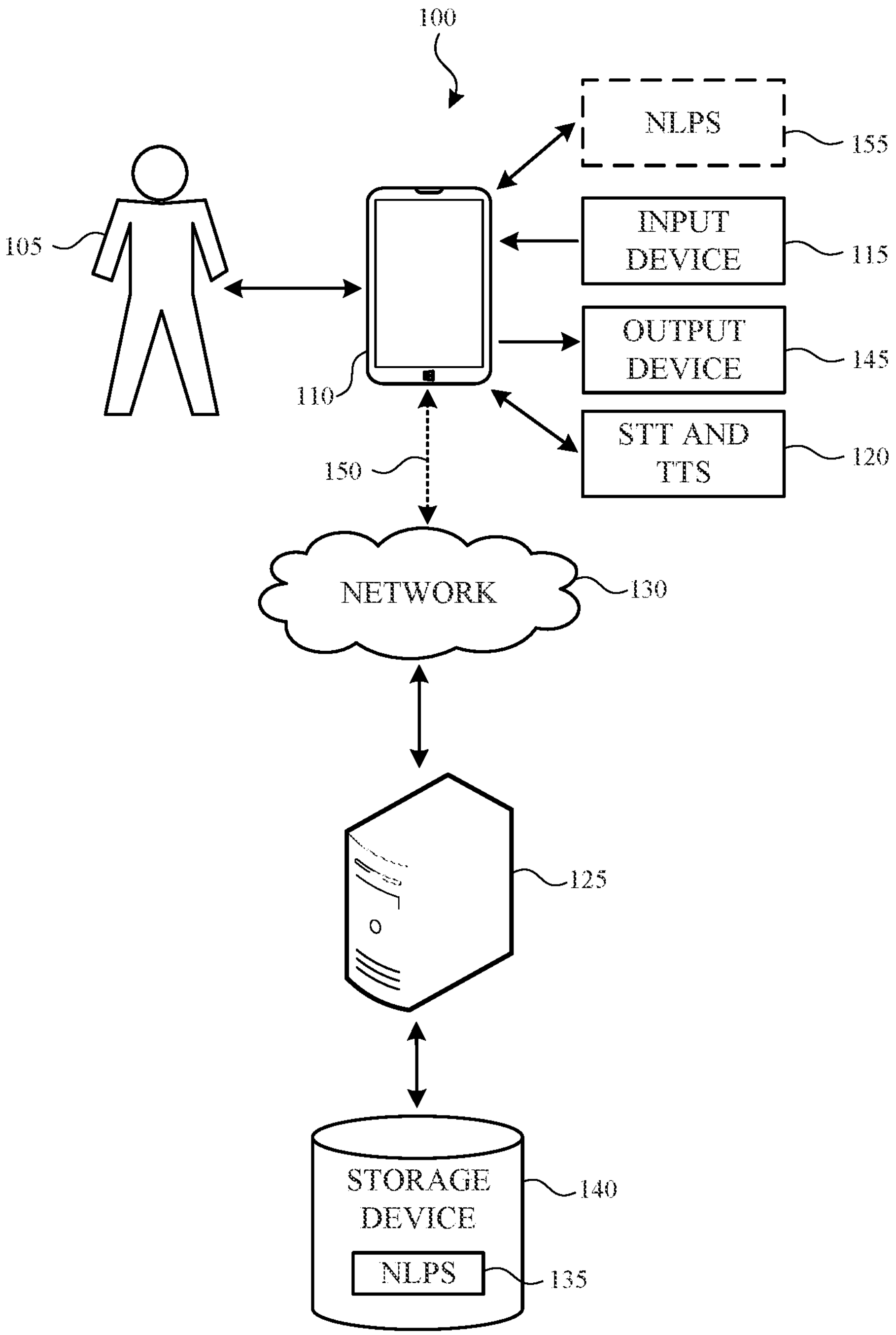
FIG. 1 illustrates an example system that can include a natural language processing system.

FIG. 1 illustrates an example system that can include a natural language processing system. The system 100 generates and controls responses to a natural language inputs (e.g., spoken and textual inputs). The system 100 allows a user 105 to submit the language input through a client-computing device 110. The client-computing device 110 includes one or more input devices 115 that receive the language input. The input device(s) 115 may be any suitable type of input device configured to receive a language input. In non-limiting examples, the input device(s) 120 may be a microphone (using a speech-to-text application (STT) 120) and/or a keyboard.

In some embodiments, the client-computing device 110 is configured to access one or more server-computing devices (represented by server-computing device 125) through one or more networks (represented by network 130) to interact with a natural language processing system (NLPS) 135 stored on one or more storage devices (represented by storage device 140) and executed by server-computing device 125. In one or more embodiments, the network 130 is illustrative of any suitable type of network, for example, an intranet, and/or a distributed computing network (e.g., the Internet) over which the user 105 may communicate with other users and with other computing systems.

The NLPS 135 can include a computer-executable program that may be stored in the storage device 140 and executed by the server-computing device 125. The NLPS 135 receives and processes the language input and determines what action is to be taken in response to the language input. The action may include asking the user 105 for more information or for confirmation through one or more output devices 145 included in the client-computing device 110 or connected to the client-computing device 110. Example output devices 145 include, but are not limited to, a speaker (using a text-to-speech (TTS) application 120) and a display.

In one or more embodiments, the client-computing device 110 is a personal or handheld computing device having both the input and output devices 115, 145. For example, the client-computing device 110 may be one of: a mobile telephone; a smart phone; a tablet; a phablet; a smart watch; a wearable computer; a personal computer; a desktop computer; a laptop computer; a gaming device/computer (e.g., Xbox); a television; and the like. This list of example client-computing devices is for example purposes only and should not be considered as limiting. Any suitable client-computing device that provides and/or interacts with a NLPS using word embeddings may be utilized.

In some aspects, the client-computing device 110 can have limited storage and/or may operate as a stand-alone device (e.g., limited or no access to network 130). The limited access to, or absence of the network 130 is represented by the dashed line 150 in FIG. 1. In such embodiments, the client-computing device 110 can include a NLPS 155 that accesses compressed word embeddings that are stored in a storage device included in, or connected to the client-computing device 110. The processes for training the NLPS 155, for compressing the word embeddings, and for decompressing the word embeddings are described in more detail in conjunction with FIGS. 3-8.

As should be appreciated, FIG. 1 is described for purposes of illustrating the present methods and systems and is not intended to limit the disclosure to a particular sequence of steps or a particular combination of hardware or software components.

Figure 2:
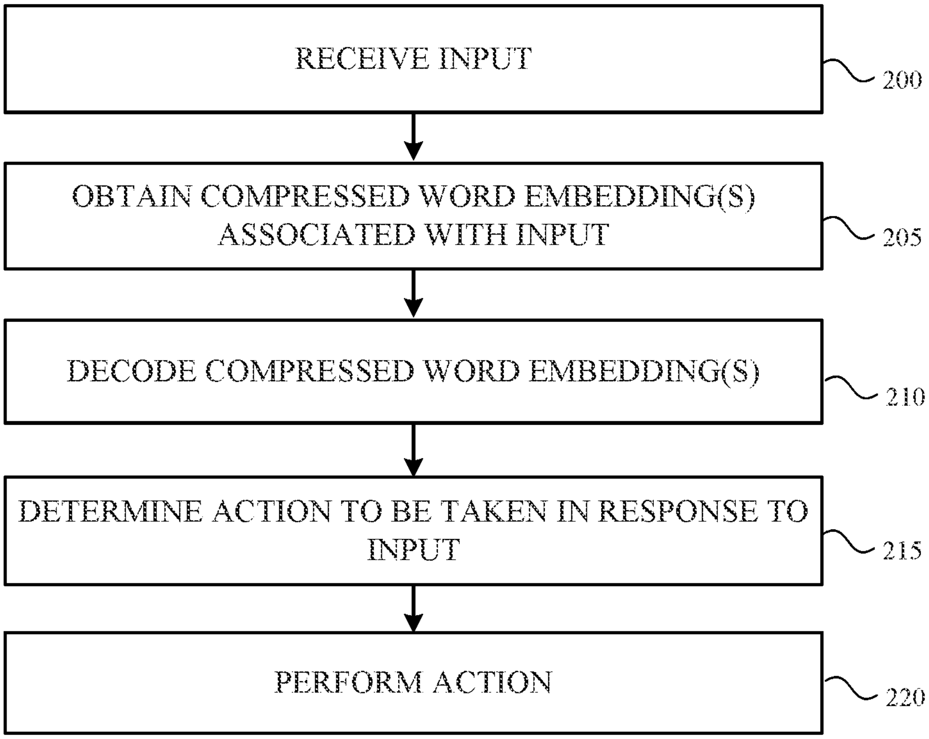
FIG. 2 is flowchart depicting a method of operating a natural language processing system that uses compressed word embeddings.

FIG. 2 is flowchart depicting a method of operating a NLPS that uses compressed word embeddings. Initially, as shown in block 200, the NLPS receives text input that is, or represents a natural language input that is received by a computing device (e.g., client-computing device 110 via input device 115 in FIG. 1). For example, in FIG. 1, the user 105 can ask the client-computing device 110 to perform an action, and the spoken input is converted to text using the STT application 120. Example requested actions include, but are not limited to, a request to call a named person, to provide directions to a location, or to find a restaurant.

Based on the text input, the NLPS obtains one or more compressed word embeddings from a storage device (block 205). As described earlier, the word embeddings can be mathematical representations of words and/or phrases in a vocabulary. In some embodiments, the word embeddings map the words and/or phrases to vectors of real numbers. During the compression process, the original mathematical representation of each word embedding (e.g., N real/float numbers) is processed and converted into a compressed second mathematical representation (e.g., M bits where M can be larger than N). In one embodiment, the compression process is a binary compression process that transforms the real number of each word embedding (e.g., a vector of real numbers) into a binary word embedding of ones and zeros (e.g., a vector of binary numbers).

Next, as shown in block 210, the one or more word embeddings are decompressed. Using the decompressed word embedding(s), the NLPS determines an action that a machine (e.g., a client-computing device) should perform in response to the text input (block 215). The action is then performed by the machine at block 220. For example, if the request is to call a friend, the action performed by the machine may be to ask the user to confirm the friend's name and number prior to initiating the call. Alternatively, the action performed by the machine can be to call the friend.

Figure 3:
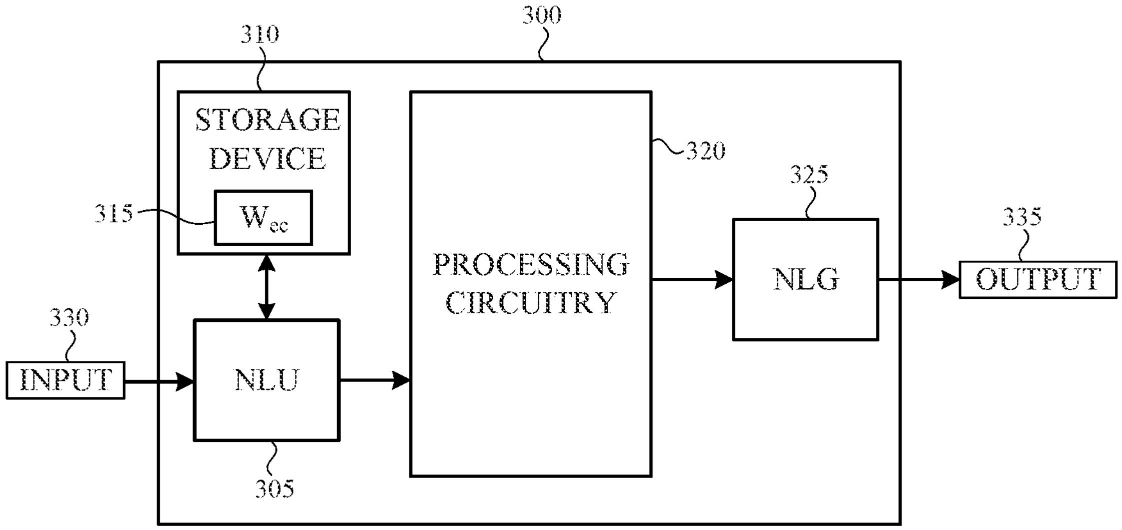
FIG. 3 is a block diagram illustrating an example natural language processing system.

FIG. 3 is a block diagram illustrating an example NLPS. The NLPS 300 can be the NLPS 135 and/or the NLPS 155 in FIG. 1. Although the NLPS 300 includes four blocks or operations, other embodiments are not limited to this configuration. A NLPS may include different and/or additional blocks or operations.

The NLPS 300 includes natural language understanding (NLU) circuitry 305 operably connected to a storage device 310 that stores compressed word embeddings ($W_{ec}$) 315. In one embodiment, the compressed word embeddings 315 comprise vectors of binary numbers that are stored in a matrix. The NLU circuitry 305 can be implemented with hardware (e.g., circuits), with software, or with a combination of hardware and software.

The NLU circuitry 305 is also operably connected to an input of processing circuitry 320. In one embodiment, the processing circuitry 320 is a neural network, such as a recurrent neural network. An output of the processing circuitry 320 is operably connected to natural language generation (NLG) circuitry 325.

As described earlier, a text input 330 is received by the NLU circuitry 305. Generally, the NLU circuitry 305 converts the text input 330 into a structured input that the processing circuitry 320 can understand and process. The NLU circuitry 305 may analyze the semantic features of the text input 330 and access the storage device 310 to obtain the compressed word embeddings 315 for some or all of the words in the text input 330.

The processing circuitry 320 decompresses the compressed word embeddings, determines or predicts an action to be taken in response to the text input 330, and outputs an internal representation of the determined action. The NLG circuitry 325 receives the internal representation of the determined action and coverts the internal representation into a natural language output 335. The natural language output 335 may then be presented to a user via a computing device (e.g., client-computing device 110 using output device 145 in FIG. 1). For example, in FIG. 1, the natural language output 335 can be an audio output that is presented to the user 105 using a speaker (output device 145 via TTS application 120) within or connected to the client-computing device 110.

As described earlier, in some embodiments, compressed word embeddings consume a reduced amount of storage compared to uncompressed word embeddings. This allows the compressed word embeddings to be stored in a client-computing device and used by a NLPS that is also included in the client-computing device. Compressed word embeddings may be stored in the client-computing device when the client-computing device has limited storage, limited, intermittent, or no network access, and/or when the client-computing device is to operate as a stand-along computing device.

Figure 4:
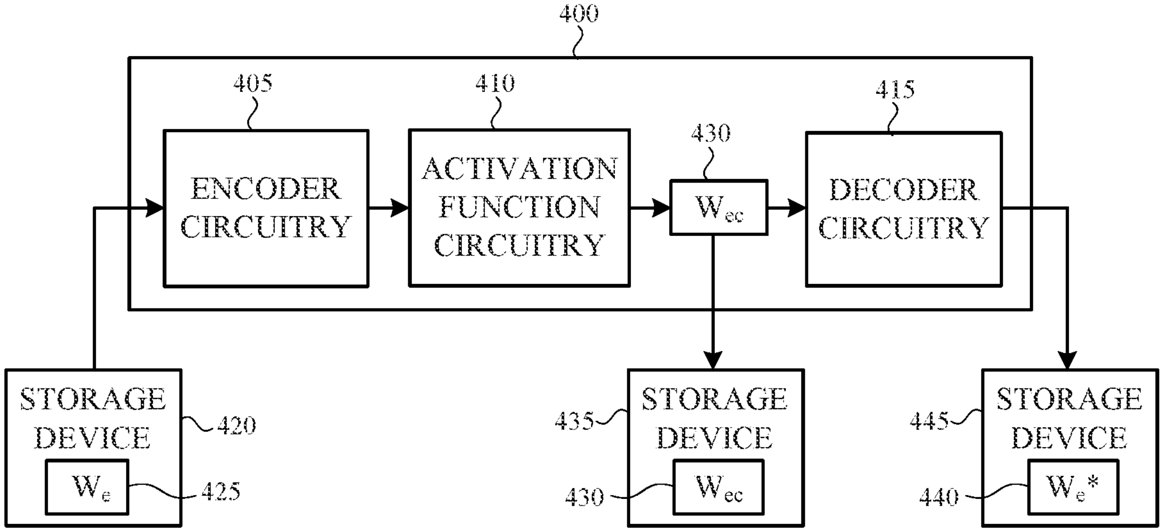
FIG. 4 is a block diagram depicting an example auto-encoder processing unit that may be used to produce compressed word embeddings.

As described earlier, an auto-encoder can be used to compress the word embeddings. FIG. 4 is a block diagram depicting an auto-encoder processing unit that may be used to produce compressed word embeddings. The auto-encoder processing unit 400 includes encoder circuitry 405 operably connected to activation function circuitry 410. The encoder circuitry 405 and the activation function circuitry 410 are used to produce the compressed word embeddings. The auto-encoder processing unit 400 further includes decoder circuitry 415 operably connected to the activation function circuitry 410. In one embodiment, the auto-encoder processing unit 400 is implemented as a multi-layer neural network with one layer comprising the encoder circuitry 405, a second layer including the activation function circuitry 410, and a third layer comprising the decoder circuitry 415. One example of the multi-layer neural network is a multi-layer bi-directional recurrent neural network. As will be described in more detail later, one or more parameters of the decoder circuitry 415 can be used in a NLPS.

An input of the encoder circuitry 405 is operably connected to a storage device 420 that stores uncompressed word embeddings ($W_e$) 425. In one embodiment, the uncompressed word embeddings 425 are vectors of real numbers that are stored in a matrix and each uncompressed word embedding ($W_e$) 425 is received by the encoder circuitry 405. In one embodiment, the encoder circuitry 405 is a linear transformation circuit that transforms the mathematical representation (e.g., real number or vector) of each word embedding from a linear space to another linear space.

The higher dimensional mathematical representation is then received by the activation function circuitry 410. In one embodiment, the activation function circuitry 410 is a nonlinear function or program that transforms the higher dimensional mathematical representation (e.g., real number) into a binary representation or number. In one embodiment, the activation function circuitry 410 operates by the following equation:

$$f(x) = \begin{cases} 0, & \text{if } x < 0 \\ 1, & \text{if } x > 0 \end{cases}, \qquad \text{Equation 1}$$

where x is an input value. If x equals 0, then the value of f(x) can be chosen to be zero or one. Any real number other than zero can be used in other embodiments. Additionally or alternatively, the equation for f(x) can include a value for f(x) that is used when x is equal to or less than (or greater than) zero. For example, f(x) can be 0 if x is less than 0.5 and 1 if greater than or equal to 0.5.

The compressed word embeddings ($W_{ec}$) 430 are output from the activation function circuitry 410 and received by the decoder circuitry 415. In one embodiment, the compressed word embeddings 430 are vectors of binary numbers that may be stored in a storage device 435 that is separate from and not part of the auto-encoder processing unit 400.

The decoder circuitry 415 acts as a decompression circuit that transforms the compressed word embedding ($W_{ec}$) 430 back into a mathematical representation in the original space (e.g., a real number). In one embodiment, the decoder circuitry 415 is a linear transformation circuit that maps the binary representation back to the original space.

The decompressed word embeddings ($W_e$*) 440 are vectors of real numbers that can be stored in a storage device 445. Typically, as indicated by the asterisk, the mathematical representation of a decompressed word embedding ($W_e$*) 440 does not match or equal the corresponding mathematical representation of the original uncompressed word embedding ($W_e$). As will be described in more detail later in conjunction with FIGS. 5 and 6, a training process is used to train the decoder circuitry 415 to minimize the differences between the mathematical representations of the decompressed word embedding ($W_e$*) 440 and the corresponding original uncompressed word embedding ($W_e$). Once trained, one or more parameters of the decoder circuitry 415 can be used in a NLPS.

Figure 5:
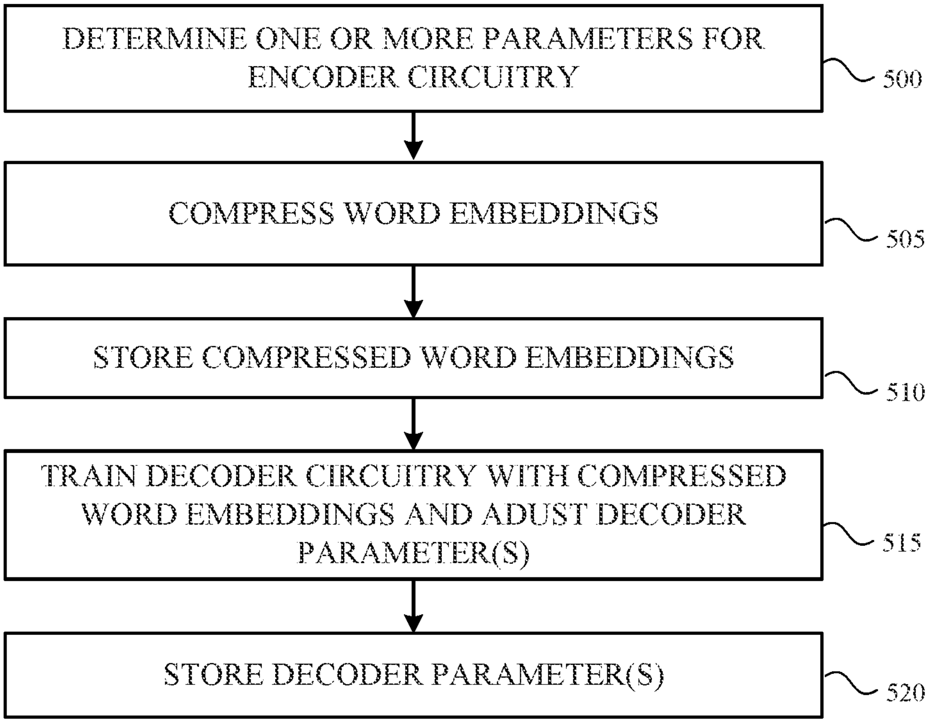
FIG. 5 is a flowchart illustrating an example method of training an auto-encoder processing unit.

FIG. 5 is a flowchart illustrating an example method of training an auto-encoder. Initially, as shown in block 500, one or more parameters for the encoder circuitry is determined. The parameter(s) of the encoder circuitry may be determined using a variety of techniques. In one embodiment, the parameter(s) are randomly initialized and fixed. With randomly initialized parameter(s), the encoder circuitry transforms the word embeddings from a di-dim manifold (e.g., a linear sub-space) onto a do-dim space which is typically chosen to be larger than di. With a probability of 1, this transformation retains the algebraic relations of the word embeddings. In one embodiment, when the transformed word embeddings are processed by the activation function circuitry (e.g., activation function circuitry 410 in FIG. 4), the activation function is a non-linear transformation that produces a binary value for the word embeddings.

The activation function circuitry stretches in the $d_0$-dim space. This binary value transformation operation substantially keeps most of the original word relationships. For example, if a word A is closer to word B than word C in the original space, these relationships may be substantially maintained after processing by the activation function circuitry.

Alternatively, the one or more parameters of the encoder circuitry may be determined by training the encoder circuitry. For example, the encoder circuitry can be trained by using a first activation function with binary output in the forward propagation phase and second continuous activation function that outputs any time ranging from 0 to 1 in the backward propagation phase. An example first activation function for the forward propagation phase is $f_f(x)=1(x\geq 0)$. An example second activation function for the backward propagation phase is:

$$f_b(x) = \begin{cases} 0, & \text{if } x \leq -c \\ (x+c)/_{2c}, & \text{if } |x| < c, \\ 1, & \text{if } x \geq c \end{cases} \qquad \text{Equation 2}$$

where x is the input and c is a fixed positive number. The variable c can have a different value in other embodiments (e.g., any real number). Alternatively, $f_b$ can be a sigmoid-like function.

After the one or more parameters of the encoder circuitry is determined, the word embeddings are compressed using the encoder circuitry and the activation function circuitry (block 505). At block 510, the compressed word embeddings are stored in a storage device (e.g., storage device 435 in FIG. 4). The decoder circuitry is then trained using the compressed word embeddings (block 515). During the training process, one or more parameters of the decoder circuitry may be adjusted to reduce or minimize the differences between the original uncompressed word embeddings and the decompressed word embeddings. As described earlier, in one embodiment, the decoder circuitry is a layer in a neural network. Thus, one or more network parameters in the neural network can be updated to reduce or minimize the differences between the original uncompressed word embeddings and the decompressed word embeddings. An example training process is described in more detail in conjunction with FIG. 6.

Next, as shown in block 520, the final decoder parameters are stored in a storage device. In some embodiments, the one or more parameters of the decoder circuitry 415 can be stored in a storage device, such as the storage device 435. As will be described in more detail in conjunction with FIG. 7, the decoder parameters are used in the NLPS to train the NLPS.

Figure 6:
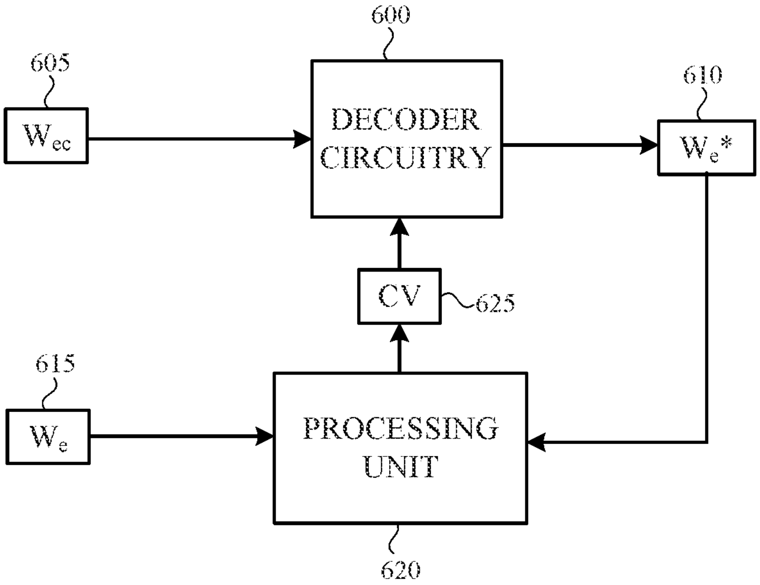
FIG. 6 is a process flow diagram depicting an example method of training the decoder circuitry.

FIG. 6 is a process flow diagram depicting an example method of training the decoder circuitry. This operation may be performed at block 510 in FIG. 5. The training process includes the decoder circuitry 600 receiving one or more compressed word embeddings ($W_{ec}$) 605. The decoder circuitry 600 decompresses the compressed word embedding(s) 605 to produce decompressed word embeddings ($W_e$) 610. As discussed earlier, one or more decompressed word embeddings 610 may not equal or match a corresponding original uncompressed word embedding $W_e$ 615. The asterisk in FIG. 6 represents the difference in the decompressed word embeddings 610**.

To eliminate or reduce the differences between the decompressed word embedding(s) 610 and the corresponding original uncompressed word embedding(s) 615, the original and the corresponding decompressed word embeddings 610, 615 are received and compared by a processing unit 620. Any suitable processing unit 620 may be used. For example, in one embodiment, the processing unit 620 is a comparator circuit. Based on the comparison, the processing unit 610 provides one or more compensation or correction values (CV) 625 to the decoder circuitry 600. One or more parameters of the decoder circuitry 600 can be updated based on the compensation value(s) 625.

The training process repeats a given number of times or until the differences between the decompressed and the original uncompressed word embeddings are at a given amount or level, or do not decrease any more. For example, in one embodiment, the training process repeats until the differences between the decompressed and the original uncompressed word embeddings equal or are less than a threshold value (or do not decrease).

Figure 7:
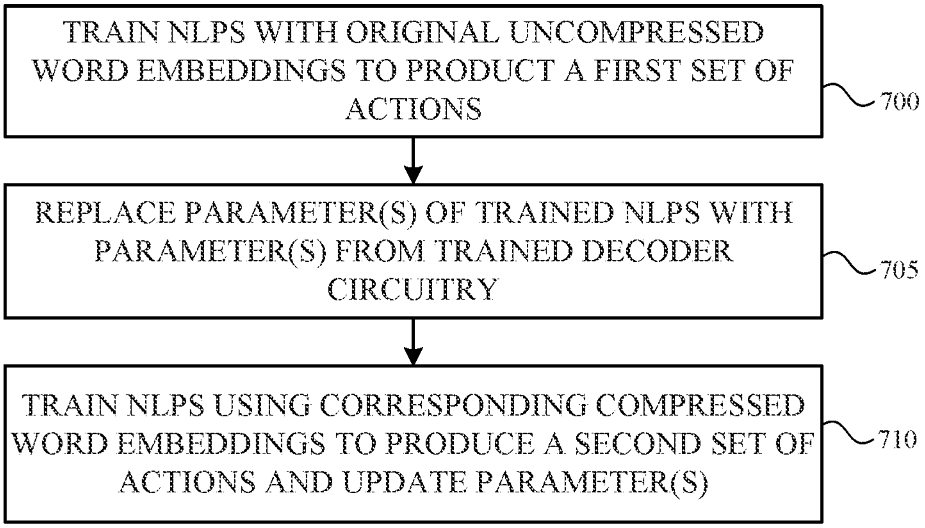
FIG. 7 is a flowchart illustrating an example method of training a natural language processing system.

FIG. 7 is a flowchart illustrating an example method of training a natural language processing system. Initially, as shown in block 700, a NLPS is trained using original uncompressed word embeddings to produce a first set of actions that have been determined by the NLPS. In one embodiment, the NLPS is trained using word embeddings from one or more known datasets. After the training process, one or more parameters of the NLPS are updated or replaced with the parameter(s) of the trained decoder circuitry (block 705). As described earlier, in one embodiment, the NLPS is implemented as a neural network. Thus, one or more network parameters in the neural network can be updated with the parameter(s) of the decoder circuitry.

Thereafter, at block 710, the NLPS is trained a second time using compressed word embeddings that correspond to the original uncompressed word embeddings. In one embodiment, an auto-encoder described in conjunction with FIGS. 4-6 is used to generate the compressed word embeddings. During the training process, a second set of actions are determined by the NLPS based on the compressed word embeddings. One or more parameters in the NLPS are updated to improve the correctness or accuracy of the actions determined by the NLPS. In other words, the parameter(s) in the NLPS are adjusted to have the second set of actions match, substantially match, or be closer to the first set of actions produced at block 700.

Figure 8:
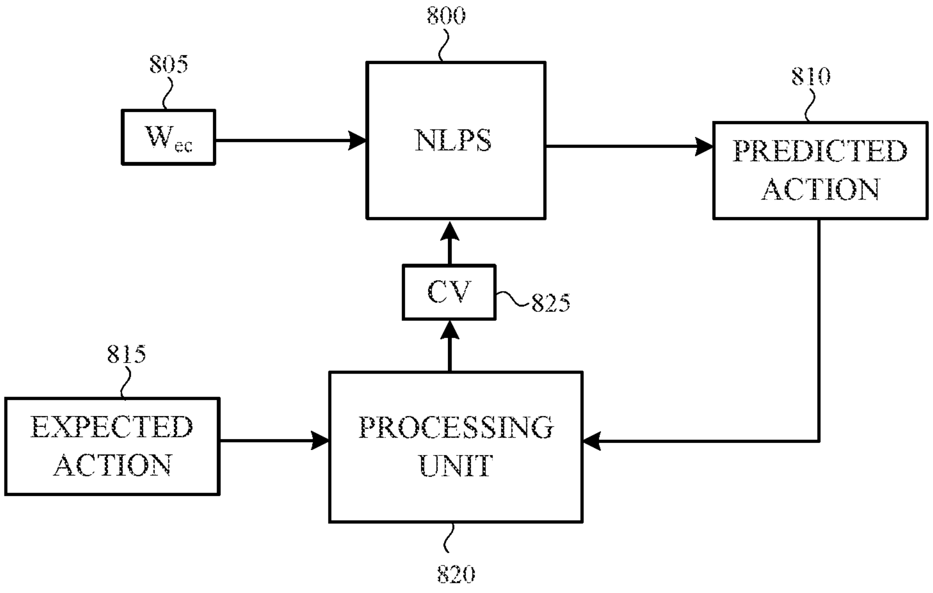
FIG. 8 is a process flow diagram depicting an example method of training the natural language processing system.

FIG. 8 is a process flow diagram depicting an example method of training the NLPS using the compressed word embeddings. This operation may be performed at block 710 in FIG. 7. The training process includes the NLPS 800 receiving one or more compressed word embeddings ($W_{ec}$) 805. The NLPS 800 decompresses the compressed word embedding(s) 805 and processes the decompressed word embeddings to produce one or more predicted actions 810.

To eliminate or reduce errors in the processing of the decompressed word embeddings, which improves the accuracy of the predicted action(s), the predicted action(s) and the corresponding expected action(s) 815 are received and compared by a processing unit 820. Any suitable processing unit 820 may be used. Based on the comparison, the processing unit 820 provides one or more compensation or correction values (CV) 825 to the NLPS 800. One or more parameters of the NLPS 800 (e.g., one or more network parameters of the neural network) can be updated based on the compensation value(s) 825 to have the predicted actions 810 match, substantially match, or be closer to the expected actions 815.

The training process repeats a given number of times or until the differences between the expected and the predicted actions are at a given level. For example, in one embodiment, the training process repeats until the correctness or accuracy of the predicted responses equals or is greater than a particular confidence value (or do not improve).

Figure 9:
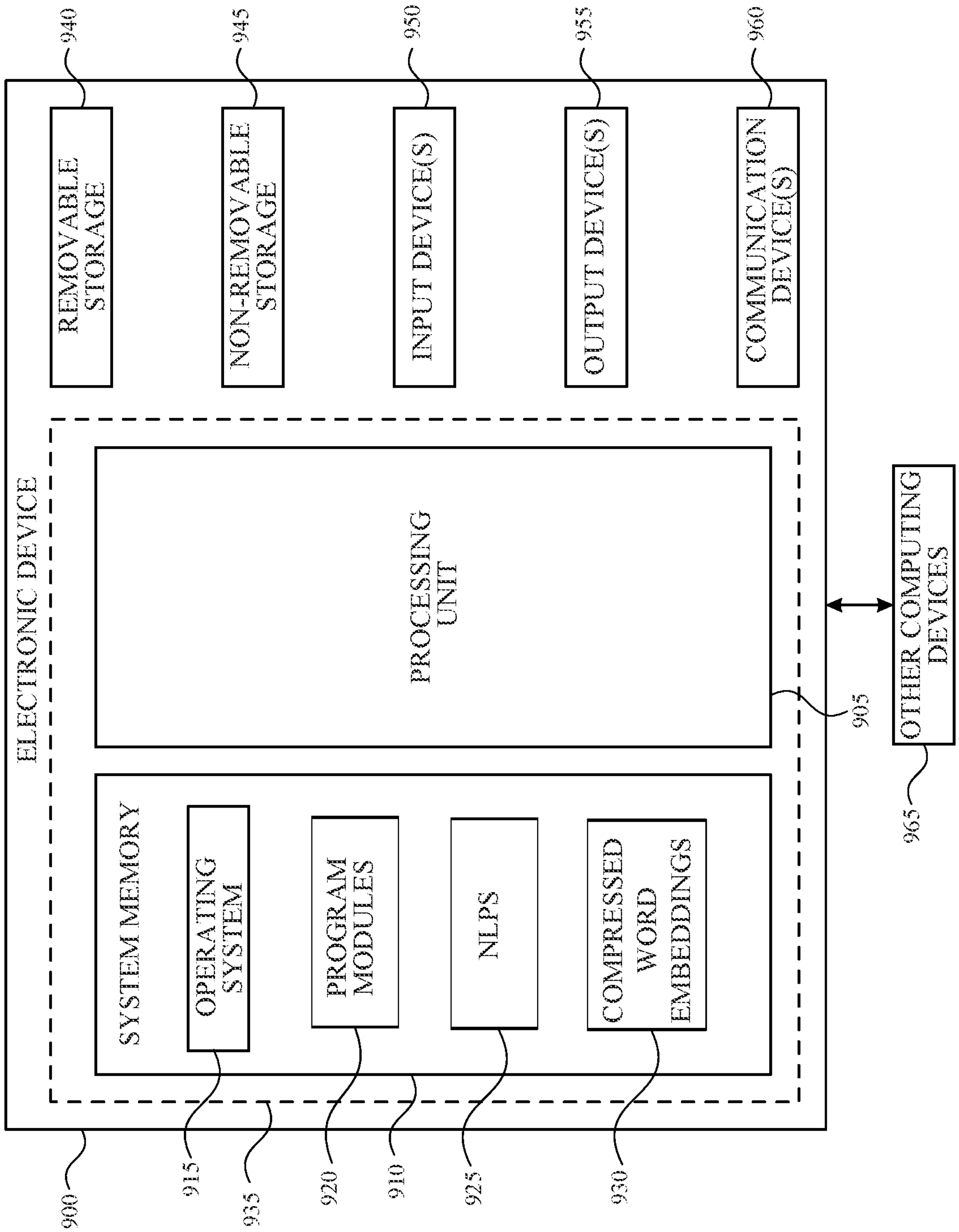
FIG. 9 is a block diagram illustrating example physical components of an electronic device with which aspects of the disclosure may be practiced.
Figure 10A:
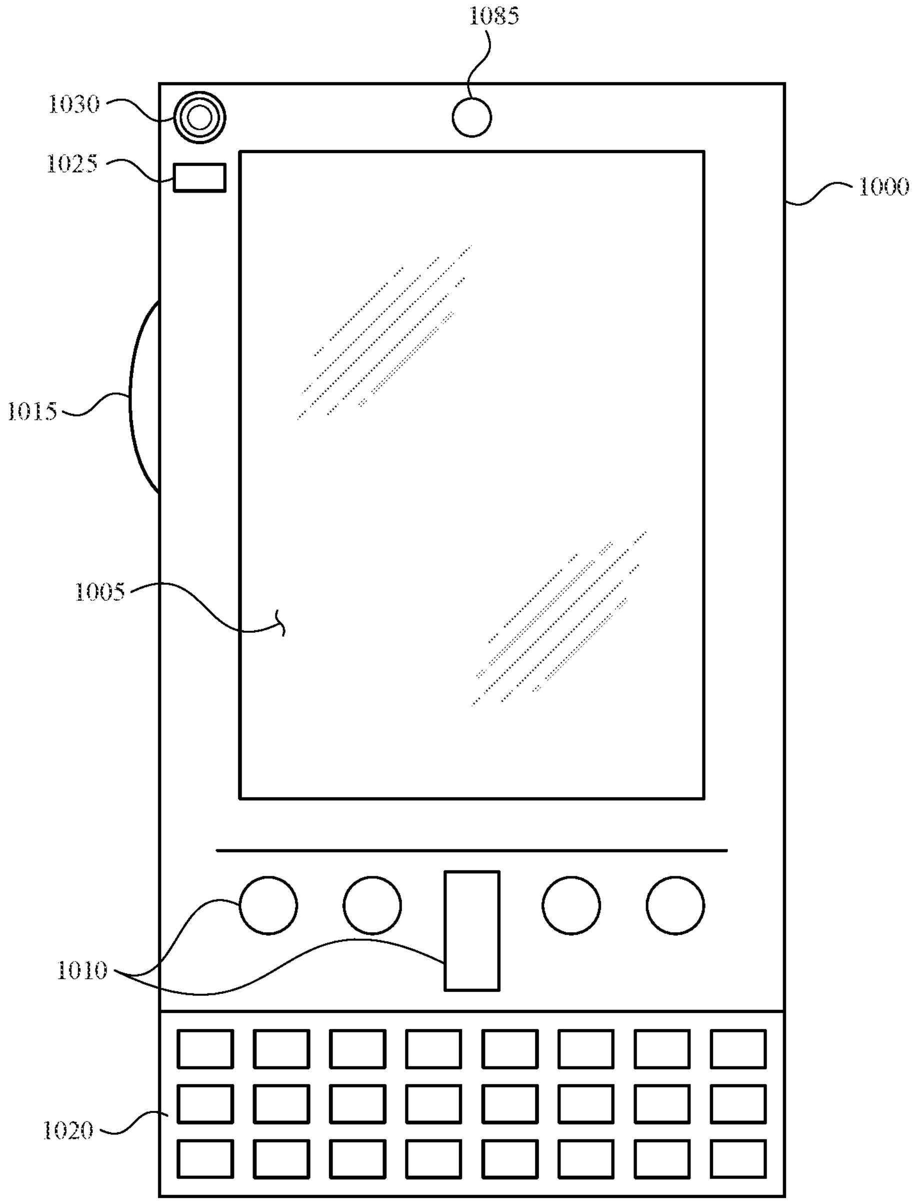
FIGS. 10A-10B are simplified block diagrams illustrating a mobile computing device with which aspects of the present disclosure may be practiced.
Figure 10B:
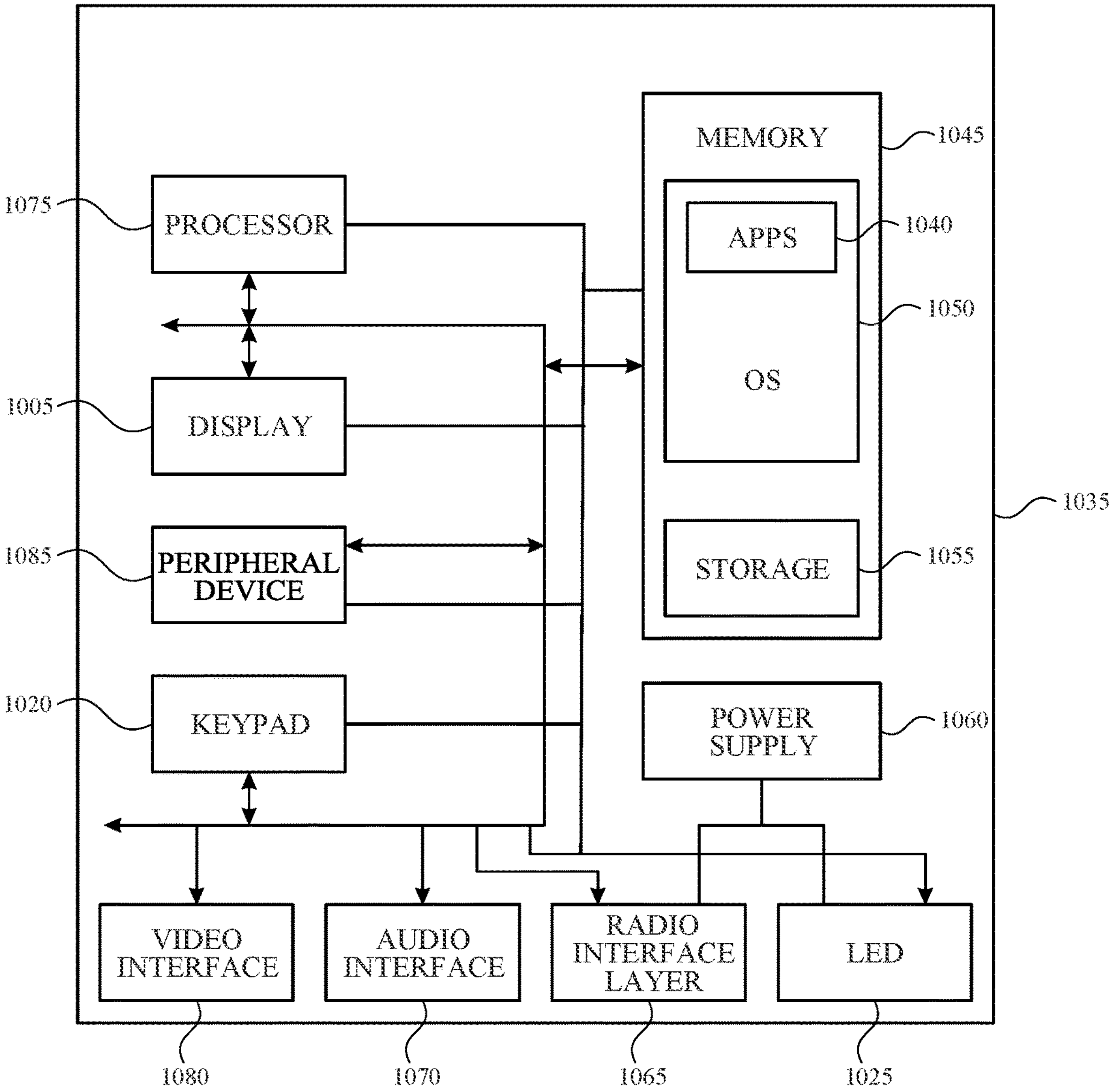
Figure 11:
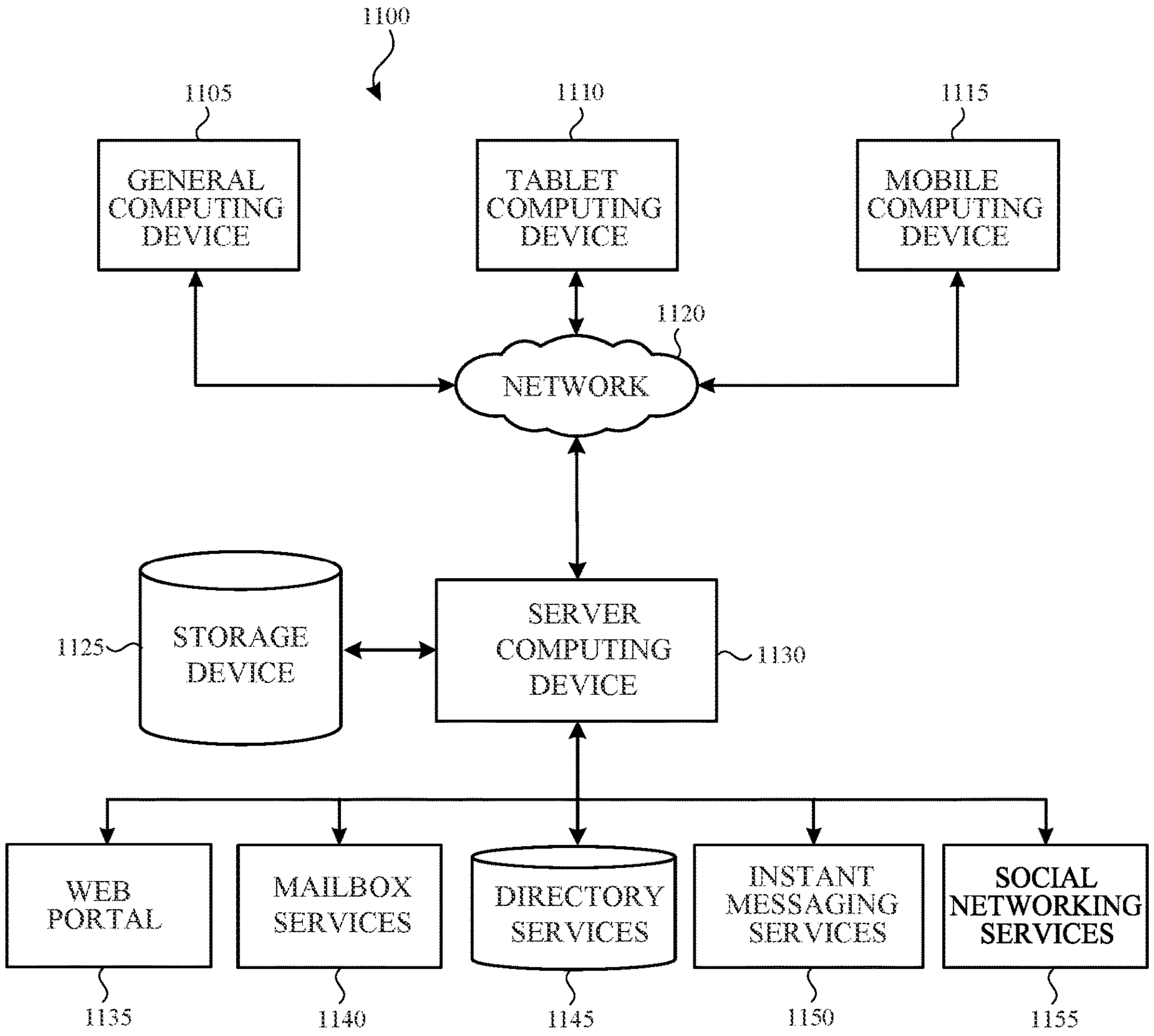
FIG. 11 is a block diagram depicting a distributed computing system in which aspects of the present disclosure may be practiced.

FIGS. 9-11 and the associated descriptions provide a discussion of a variety of operating environments in which aspects of the disclosure may be practiced. However, the devices and systems illustrated and discussed with respect to FIGS. 9-11 are for purposes of example and illustration and are not limiting of a vast number of electronic device configurations that may be utilized for practicing aspects of the disclosure, as described herein.

FIG. 9 is a block diagram depicting physical components (e.g., hardware) of an electronic device 900 with which aspects of the disclosure may be practiced. The components described below may be suitable for the computing devices described above, including the client-computing device 110 in FIG. 1.

In a basic configuration, the electronic device 900 may include at least one processing unit 905 and a system memory 910. Depending on the configuration and type of the electronic device, the system memory 910 may comprise, but is not limited to, volatile storage (e.g., random access memory), non-volatile storage (e.g., read-only memory), flash memory, or any combination of such memories. The system memory 910 may include a number of program modules and data files, such as an operating system 915, one or more program modules 920 suitable for parsing received input, determining subject matter of received input, determining actions associated with the input and so on, a NLPS 925, and compressed word embeddings 930. While executing on the processing unit 905, the NLPS 925 may perform and/or cause to be performed processes including, but not limited to, the aspects as described herein.

The operating system 915, for example, may be suitable for controlling the operation of the electronic device 900. Furthermore, embodiments of the disclosure may be practiced in conjunction with a graphics library, other operating systems, or any other application program and is not limited to any particular application or system. This basic configuration is illustrated in FIG. 9 by those components within a dashed line 935.

The electronic device 900 may have additional features or functionality. For example, the electronic device 900 may also include additional data storage devices (removable and/or non-removable) such as, for example, magnetic disks, optical disks, or tape. Such additional storage is illustrated in FIG. 9 by a removable storage device 940 and a non-removable storage device 945.

The electronic device 900 may also have one or more input device(s) 950 such as a keyboard, a trackpad, a mouse, a pen, a sound or voice input device, a touch, force and/or swipe input device, etc. The output device(s) 955 such as a display, speakers, a printer, etc. may also be included. The aforementioned devices are examples and others may be used. The electronic device 900 may include one or more communication devices 960 allowing communications with other electronic devices 965. Examples of suitable communication devices 960 include, but are not limited to, a radio frequency (RF) transmitter, a receiver, and/or transceiver circuitry, network circuitry, and universal serial bus (USB), parallel, and/or serial ports.

The term computer-readable media as used herein may include computer storage media or devices. Computer storage devices may include volatile and nonvolatile, removable and non-removable storage devices implemented in any method or technology for storage of information, such as computer readable instructions, data structures, or program modules.

The system memory 910, the removable storage device 940, and the non-removable storage device 945 are all computer storage device examples (e.g., memory storage). Computer storage devices may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the electronic device 900. Any such computer storage device may be part of the electronic device 900. Computer storage device does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors.

FIGS. 10A and 10B illustrate a mobile electronic device 1000, for example, a mobile telephone, a smart phone, wearable computer (such as a smart watch), a tablet computer, a laptop computer, a navigation device, a gaming device, and the like, with which embodiments of the disclosure may be practiced. With reference to FIG. 10A, one aspect of a mobile electronic device 1000 for implementing the aspects is illustrated.

In a basic configuration, the mobile electronic device 1000 is a handheld computer having both input elements and output elements. The mobile electronic device 1000 typically includes a display 1005 and one or more input buttons 1010 that allow the user to enter information into the mobile electronic device 1000. The display 1005 of the mobile electronic device 1000 may also function as an input device (e.g., a display that accepts touch and/or force input).

If included, an optional side input element 1015 allows further user input. The side input element 1015 may be a rotary switch, a button, or any other type of manual input element. In alternative aspects, mobile electronic device 1000 may incorporate more or less input elements. For example, the display 1005 may not be a touch screen in some embodiments. In yet another alternative embodiment, the mobile electronic device 1000 is a portable phone system, such as a cellular phone. The mobile electronic device 1000 may also include an optional keypad 1020. Optional keypad 1020 may be a physical keypad or a "soft" keypad generated on the touch screen display.

In various embodiments, the output elements include the display 1005 for showing a graphical user interface (GUI) and a set of available templates, a visual indicator 1025 (e.g., a light emitting diode), and/or an audio transducer 1030 (e.g., a speaker). In some aspects, the mobile electronic device 1000 incorporates a vibration transducer for providing the user with tactile feedback. In yet another aspect, the mobile electronic device 1000 incorporates input and/or output ports, such as an audio input (e.g., a microphone jack), an audio output (e.g., a headphone jack), and a video output (e.g., a HDMI port) for sending signals to or receiving signals from an external device.

FIG. 10B is a block diagram illustrating the architecture of one aspect of a mobile electronic device 1000. That is, the mobile electronic device 1000 can incorporate a system (e.g., an architecture) 1035 to implement some aspects. In one embodiment, the system 1035 is implemented as a "smart phone" capable of running one or more applications (e.g., browser, e-mail, calendaring, contact managers, messaging clients, games, media clients/players, content selection and sharing applications and so on). In some aspects, the system 1035 is integrated as an electronic device, such as an integrated personal digital assistant (PDA) and wireless phone.

One or more application programs 1040 may be loaded into the memory 1045 and run on or in association with the operating system 1050. Examples of the application programs include phone dialer programs, navigation programs, e-mail programs, personal information management (PIM) programs, word processing programs, spreadsheet programs, Internet browser programs, messaging programs, and so forth.

The system 1035 also includes a non-volatile storage area 1055 within the memory 1045. The non-volatile storage area 1055 may be used to store persistent information that should not be lost if the system 1035 is powered down.

The application programs 1040 may use and store information in the non-volatile storage area 1055, such as an NLPS, compressed word embeddings, and the like. A synchronization application (not shown) also resides on the system 1035 and is programmed to interact with a corresponding synchronization application resident on a host computer to keep the information stored in the non-volatile storage area 1055 synchronized with corresponding information stored at the host computer.

The system 1035 has a power supply 1060, which may be implemented as one or more batteries. The power supply 1060 may further include an external power source, such as an AC adapter or a powered docking cradle that supplements or recharges the batteries.

The system 1035 may also include a radio interface layer 1065 that performs the function of transmitting and receiving radio frequency communications. The radio interface layer 1065 facilitates wireless connectivity between the system 1035 and the "outside world," via a communications carrier or service provider. Transmissions to and from the radio interface layer 1065 are conducted under control of the operating system 1050. In other words, communications received by the radio interface layer 1065 may be disseminated to the application programs 1040 via the operating system 1050, and vice versa.

The visual indicator 1025 may be used to provide visual notifications, and/or an audio interface 1070 may be used for producing audible notifications via an audio transducer (e.g., audio transducer 1030 illustrated in FIG. 10A). In the illustrated embodiment, the visual indicator 1025 is a light emitting diode (LED) and the audio transducer 1030 may be a speaker. These devices may be directly coupled to the power supply 1060 so that when activated, they remain on for a duration dictated by the notification mechanism even though the processor 1075 and other components might shut down for conserving battery power. The LED may be programmed to remain on indefinitely until the user takes action to indicate the powered-on status of the device.

The audio interface 1070 is used to provide audible signals to and receive audible signals from the user (e.g., voice input such as described above). For example, in addition to being coupled to the audio transducer 1030, the audio interface 1070 may also be coupled to a microphone to receive audible input, such as to facilitate a telephone conversation. In accordance with embodiments of the present disclosure, the microphone may also serve as an audio sensor to facilitate control of notifications, as will be described below.

The system 1035 may further include a video interface 1080 that enables an operation of peripheral device 1085 (e.g., on-board camera) to record still images, video stream, and the like.

A mobile electronic device 1000 implementing the system 1035 may have additional features or functionality. For example, the mobile electronic device 1000 may also include additional data storage devices (removable and/or non-removable) such as, magnetic disks, optical disks, or tape. Such additional storage is illustrated in FIG. 10B by the non-volatile storage area 1055.

Data/information generated or captured by the mobile electronic device 1000 and stored via the system 1035 may be stored locally on the mobile electronic device 1000, as described above, or the data may be stored on any number of storage media that may be accessed by the device via the radio interface layer 1065 or via a wired connection between the mobile electronic device 1000 and a separate electronic device associated with the mobile electronic device 1000, for example, a server-computing device in a distributed computing network, such as the Internet (e.g., server-computing device 125 in FIG. 1). As should be appreciated such data/information may be accessed via the mobile electronic device 1000 via the radio interface layer 1065 or via a distributed computing network. Similarly, such data/information may be readily transferred between electronic devices for storage and use according to well-known data/information transfer and storage means, including electronic mail and collaborative data/information sharing systems.

As should be appreciated, FIG. 10A and FIG. 10B are described for purposes of illustrating the present methods and systems and is not intended to limit the disclosure to a particular sequence of steps or a particular combination of hardware or software components.

FIG. 11 is a block diagram illustrating a distributed system in which aspects of the disclosure may be practiced. The system 1100 allows a user to interact with a NLPS using, or through a general computing device 1105 (e.g., a desktop computer), a tablet computing device 1110, and/or a mobile computing device 1115. The general computing device 1105, the tablet computing device 1110, and the mobile computing device 1115 can each include the components, or be connected to the components, that are shown associated with the electronic device 900 in FIG. 9.

The general computing device 1105, the tablet computing device 1110, and the mobile computing device 1115 are each configured to access one or more networks (represented by network 1120) to interact with one or more programs (not shown) stored in one or more storage devices (represented by storage device 1125). The program(s) stored on storage device 1125 can be executed on one or more server-computing devices (represented by server-computing device 1130).

In some aspects, the server-computing device 1130 can access and/or receive various types of services, communications, documents and information transmitted from other sources, such as a web portal 1135, a mailbox services 1140, a directory services 1145, instant messaging services 1150, and/or social networking services 1155. In some instances, these sources may provide robust reporting, analytics, data compilation and/or storage service, etc., whereas other services may provide search engines or other access to data and information, images, videos, document processing and the like.

As should be appreciated, FIG. 11 is described for purposes of illustrating the present methods and systems and is not intended to limit the disclosure to a particular sequence of steps or a particular combination of hardware or software components.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The invention claimed is:

1. A computing system, comprising:

at least one processor; and a memory storing instructions that, when executed by the at least one processor, cause the system to perform a set of operations, the set of operations comprising:

receiving a spoken language input via a speech-to-text application;

obtaining original uncompressed word embeddings for the spoken language input, the original uncompressed word embeddings including a vector of real numbers;

generating input text compressed word embeddings based on the uncompressed word embeddings using an encoder of a trained auto-encoder, the input text compressed word embeddings including a vector of binary numbers;

processing the input text compressed word embeddings with a neural network to generate output compressed word embeddings including a vector of binary numbers;

decompressing the output compressed word embeddings to produce one or more decompressed word embeddings using a decoder of the trained auto-encoder; and outputting a natural language output based on the one or more decompressed word embeddings, using a text-to-speech application.

2. A method, comprising:

obtaining a first set of one or more uncompressed word embeddings;

obtaining a first set of one or more compressed word embeddings corresponding to the first set of one or more uncompressed word embeddings from an encoder of an auto-encoder;

adjusting a set of parameters to reduce differences between a first set of decompressed word embeddings corresponding to the first set of one or more compressed word embeddings and the first set of one or more uncompressed word embeddings;

training a decoder of the auto-encoder separately from the encoder using the set of parameters; and storing, for subsequent processing by the natural language processor, the first set of one or compressed word embeddings and the set of parameters, wherein the method further comprises, during training:

training the natural language processor using a second set of one or more uncompressed word embeddings and generating one or more parameters of the natural language processor;

obtaining a second set of one or more compressed word embeddings that correspond to the second set of one or more uncompressed word embeddings and the set of parameters of the decoder of the auto-encoder;

updating at least one of one or more parameters of the natural language processor with at least one of the set of parameters of the decoder of the auto-encoder; and retraining the natural language processor using the second set of one or more compressed word embeddings and the updated one or more parameters of the natural language processor.

3. The method of claim 2, wherein the auto-encoder further comprises a function activator operably connected to the encoder.

4. The method of claim 3, wherein the auto-encoder comprises a multi-layer neural network with the encoder comprising a first layer, the function activator a second layer, and the decoder a third layer.

5. The method of claim 4, wherein the function activator comprises a non-linear activation function.

6. The method of claim 5, wherein the encoder comprises a first linear transformation circuit.

7. The method of claim 6, wherein the decoder comprises a second linear transformation circuit.

8. The method of claim 4, wherein the encoder comprises one or more parameters that are randomly initialized.

9. The method of claim 4, wherein the encoder comprises one or more parameters that are determined through a training process.

10. The method of claim 4, wherein the decoder comprises the set of parameters that are determined through a training process.

11. The system of claim 1, wherein the auto-encoder comprises a multi-layer neural network including a first layer, a second layer, and a third layer, wherein the first layer includes the encoder, the second layer is operatively coupled to the encoder and includes a function activator, the third layer includes the decoder of the auto-encoder.

12. A method, comprising:

receiving, by a natural language processor, an input;

obtaining, by the natural language processor and from a storage device, one or more compressed word embeddings based on the input, wherein the one or more compressed word embeddings were generated by an encoder of an auto-encoder prior to receiving the input;

decompressing, by the natural language processor, the one or more compressed word embeddings to produce one or more decompressed word embeddings, wherein the storage device further comprises one or more parameters that are generated by a decoder of the auto-encoder, and wherein the natural language processor and the decoder were trained separately from the encoder; and determining, by the natural language processor, an action to be performed in response to the input based on the one or more decompressed word embeddings, wherein the method further comprises, during training:

training the natural language processor using one or more uncompressed word embeddings and generating one or more parameters of the natural language processor;

obtaining one or more compressed word embeddings that correspond to the one or more uncompressed word embeddings and a set of parameters of the decoder of the auto-encoder;

updating at least one of one or more parameters of the natural language processor with at least one of the set of parameters of the decoder of the auto-encoder; and retraining the natural language processor using the one or more compressed word embeddings and the updated one or more parameters of the natural language processor.

13. The method of claim 12, wherein the decoder was trained using the compressed word embeddings generated by the encoder to generate the one or more parameters.

14. The method of claim 13, wherein the decoder was trained to reduce a difference between the one or more decompressed word embeddings and original word embeddings that were processed by the encoder.

15. The method of claim 12, wherein the encoder is remote from the storage device.

16. The method of claim 12, further comprising performing the determined action.

17. The method of claim 12, wherein the input comprises natural language input from a user.

18. The computing system of claim 1, wherein the neural network is a recurrent neural network.

19. The computing system of claim 1, further comprising:

a mobile electronic device that includes the processor and memory, and further includes a microphone configured to receive the spoken language input and a speaker configured to output audio of the natural language output.

* * * * *